United States Patent
Vincent et al.

(10) Patent No.: US 6,850,230 B1
(45) Date of Patent: Feb. 1, 2005

(54) ELECTRONIC WRITING AND ERASING PENCIL

(75) Inventors: Kent D. Vincent, Cupertino, CA (US); R. Stanley Williams, Redwood City, CA (US); Xiao-An Zhang, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 125 days.

(21) Appl. No.: 09/981,131

(22) Filed: Oct. 16, 2001

(51) Int. Cl.$^7$ .................................................. G09G 5/00
(52) U.S. Cl. ........................ 345/179; 345/105; 345/84
(58) Field of Search ................................. 345/107–109, 345/84, 85, 179, 105, 49, 87; 359/296, 265–274, 321; 348/877; 178/19.01, 20.01; 365/151

(56) References Cited

U.S. PATENT DOCUMENTS

| | | | |
|---|---|---|---|
| 4,142,783 A | * | 3/1979 | Engler et al. ............... 359/265 |
| 5,136,404 A | * | 8/1992 | Nobile et al. ............... 349/110 |
| 5,604,027 A | | 2/1997 | Sheridon .................... 428/323 |
| 5,793,360 A | | 8/1998 | Fleck et al. |
| 6,031,756 A | * | 2/2000 | Gimzewski et al. ......... 365/151 |
| 6,045,955 A | * | 4/2000 | Vincent ....................... 430/45 |
| 6,118,426 A | | 9/2000 | Albert et al. |
| 6,124,851 A | | 9/2000 | Jacobson ..................... 345/206 |
| 6,172,798 B1 | | 1/2001 | Albert et al. |
| 6,473,072 B1 | * | 10/2002 | Comiskey et al. .......... 345/173 |
| 2002/0154382 A1 | * | 10/2002 | Morrison et al. ........... 359/296 |
| 2003/0071800 A1 | * | 4/2003 | Vincent et al. ............. 345/204 |

FOREIGN PATENT DOCUMENTS

| | | | |
|---|---|---|---|
| EP | 0721176 | | 7/1996 |
| JP | 63-192123 | * 8/1988 | ............. G06F/3/03 |
| JP | 63-201815 | * 8/1988 | ........... G06F/3/033 |
| JP | 04-042291 | * 2/1992 | ............. G09G/3/38 |
| JP | 08-292408 | * 11/1996 | ............. G02F/1/13 |
| WO | WO9803896 | | 1/1998 |
| WO | WO0067110 | | 11/2000 |

\* cited by examiner

*Primary Examiner*—Alexander Eisen

(57) ABSTRACT

An electronic writing instrument for rewritable electronic writing surfaces. A self-powered, untethered, pencil-like instrument uses a fringe field for changing the orientation of pixels composed of molecular colorant elements. An appendix hereto describes the molecular colorant.

5 Claims, 3 Drawing Sheets

ELECTRONIC WRITING AND ERASING PENCIL

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

The present application includes a hard copy appendix comprising pertinent specification pages and drawings of co-inventors' U.S. patent application Ser. No. 09/844,862, filed Apr. 27, 2001, by ZHANG, WILLIAMS and VINCENT for MOLECULAR MECHANICAL DEVICES WITH A BAND GAP CHANGE ACTIVATED BY AN ELECTRIC FIELD FOR OPTICAL SWITCHING APPLICATIONS as relates to subject matter claimed in accordance with the present invention.

BACKGROUND OF THE INVENTION

1. Field of the Invention

The present invention relates generally to an electronic writing and erasing device, and specifically to a handheld, pencil-like, electronic writing and erasing instrument adapted for use with a rewritable media, displays, and surfaces, particularly those using a nanotechnology-based display colorant.

2. Description of Related Art

There have been recent developments in the field of "electronic media." Commercially available mechanisms by Xerox Corporation with respect to its Gyricon™ sphere technology and E Ink Corporation with respect to its bichromal microcapsule technology are used to produce electronic images, improving resolution over conventional displays such as liquid crystal displays ("LCD"). See e.g., U.S. Pat. No. 5,604,027 (Sheridon, assignee Xerox Corp.) and U.S. Pat. No. 6,124,851 (Jacobson, assignee E Ink Corp.).

Assignee herein, Hewlett-Packard Company, has gone beyond these microcapsule-based colorant technologies by creating a bi-modal molecular colorant that is useful for rewritable media, displays, surfaces, and the like. In some embodiments, the molecules are also bistable, meaning that an electronic holding field is not necessary to maintain a particular state. The term "rewritable" as used herein should be understood to mean writable and erasable. In the main, the goal of such electronic, rewritable product development is to provide a means for producing electronic images that truly resembles hard copy in appearance and readability. The Appendix hereto provides a detailed description of one of the Hewlett-Packard inventions in this field of technology.

In general, electronic display and electronic media devices use conventional input mechanisms such as computer keyboards, computer adapted styli, computer mouse, Wacom™ cable-connected Deskpad and writing stylus, and the like, coupled to electrode arrays proximate the electronic media, or electronic media based display, to image data into a readable format.

There is a need for a computer-free device to manually image and to annotate images produced electronically.

BRIEF SUMMARY OF THE INVENTION

In its basic aspect, the present invention provides an electronic stylus apparatus including: a portable power source; connected to the power source, at least one electrode for producing a localized, emanating, electric field wherein the field is of a strength sufficient to reorient electronic picture elements formed of an electrically bistable colorant.

In another aspect, the present invention provides a method for electronic erasable writing, the method including: providing a surface having picture elements defined by a bistable, bichromal, colorant elements; and moving a portable, perpendicular electrical fringe field, tuned to changing orientation of the colorant elements, across said surface in a manner substantially identical to conventional handwriting.

In still another aspect, the present invention provides an erasable writing system including: an electronically writable-erasable surface having a layer of bistable, bichromal, colorant thereon; and a portable, electronic stylus adapted for writing and erasing said colorant.

The foregoing summary and list of advantages is not intended by the inventors to be an inclusive list of all the aspects, objects, advantages and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Other objects, features and advantages of the present invention will become apparent upon consideration of the following explanation and the accompanying drawings, in which like reference designations represent like features throughout the drawings.

BRIEF DESCRIPTION OF THE DRAWINGS

In accordance with 37 C.F.R. 1.84(u), in order to prevent confusion with FIGURES of the Appendix hereto, the drawings of this application use double capital letter suffices.

The drawings referred to in this specification should be understood as not being drawn to scale except if specifically annotated.

DETAILED DESCRIPTION OF THE INVENTION

Reference is made now in detail to a specific embodiment of the present invention, which illustrates the best mode presently contemplated by the inventors for practicing the invention. Alternative embodiments are also briefly described as applicable.

DEFINITIONS

The following terms and ideas are applicable to both the present discussion and the Appendix hereto.

The term "self-assembled" as used herein refers to a system that naturally adopts some geometric pattern because of the identity of the components of the system; the system achieves at least a local minimum in its energy by adopting this configuration.

The term "singly configurable" means that a switch can change its state only once via an irreversible process such as an oxidation or reduction reaction; such a switch can be the basis of a programmable read-only memory (PROM), for example.

The term "reconfigurable" means that a switch can change its state multiple times via a reversible process such as an oxidation or reduction; in other words, the switch can be opened and closed multiple times, such as the memory bits in a random access memory (RAM) or a color pixel in a display.

The term "bistable" as applied to a molecule means a molecule having two relatively low energy states (local minima) separated by an energy (or activation) barrier. The molecule may be either irreversibly switched from one state to the other (singly configurable) or reversibly switched from one state to the other (reconfigurable). The term "multi-stable" refers to a molecule with more than two such low energy states, or local minima.

The term "bi-modal" for colorant molecules in accordance with the present invention may be designed to include the case of no, or low, activation barrier for fast but volatile switching. In this latter situation, bistability is not required, and the molecule is switched into one state by the electric field and relaxes back into its original state upon removal of the field; such molecules are referred to as "bi-modal". In effect, these forms of the bimodal colorant molecules are "self-erasing". In contrast, in bistable colorant molecules the colorant molecule remains latched in its state upon removal of the field (non-volatile switch), and the presence of the activation barrier in that case requires application of an opposite field to switch the molecule back to its previous state. Also, "molecular colorant" as used hereinafter as one term to describe aspects of the present invention is to be distinguished from other chemical formulations, such as dyes, which act on a molecular level; in other words, "molecular colorant" used hereinafter signifies that the colorant molecules as described in the Appendix and their equivalents are employed in accordance with the present invention.

Micron-scale dimensions refers to dimensions that range from 1 micrometer to a few micrometers in size.

Sub-micron scale dimensions refers to dimensions that range from 1 micrometer down to 0.05 micrometers.

Nanometer scale dimensions refers to dimensions that range from 0.1 m nanometers to 50 nanometers (0.05 micrometers).

Micron-scale and submicron-scale wires refers to rod or ribbon-shaped conductors or semiconductors with widths or diameters having the dimensions of 0.05 to 10 micrometers, heights that can range from a few tens of nanometers to a micrometer, and lengths of several micrometers and longer.

"HOMO" is the common chemical acronym for "highest occupied molecular orbital", while "LUMO" is the common chemical acronym for "lowest unoccupied molecular orbital". HOMOs and LUMOs are responsible for electronic conduction in molecules and the energy difference between the HOMO and LUMO and other energetically nearby molecular orbitals is responsible for the color of the molecule.

An "optical switch," in the context of the present invention, involves changes in the electromagnetic properties of the molecules, both within and outside that detectable by the human eye, e.g., ranging from the far infra-red (IR) to deep ultraviolet (UV). Optical switching includes changes in properties such as absorption, reflection, refraction, diffraction, and diffuse scattering of electro-magnetic radiation.

The term "transparency" is defined within the visible spectrum to mean that optically, light passing through the colorant is not impeded or altered except in the region in which the colorant spectrally absorbs. For example, if the molecular colorant does not absorb in the visible spectrum, then the colorant will appear to have water clear transparency.

The term "omni-ambient illumination viewability" is defined herein as the viewability under any ambient illumination condition to which the eye is responsive.

As a general proposition, "media" in the context of the present invention includes any surface, whether portable or fixed, that contains or is layered with a molecular colorant or a coating containing molecular colorant in accordance with the present invention wherein "bistable" molecules are employed; for example, both a flexible sheet exhibiting all the characteristics of a piece of paper and a writable surface of an appliance (be it a refrigerator door or a computing appliance using the molecular colorant). "Display" (or "screen") in the context of the present invention includes any apparatus that employs "bimodal" molecules, but not necessarily bistable molecules. Because of the blurred line regarding where media type devices ends and display mechanisms begin, no limitation on the scope of the invention is intended nor should be implied from a designation of any particular embodiment as a "media" or as a "display."

As will become apparent from reading the Detailed Description and Appendix, "molecule" can be interpreted in accordance with the present invention to mean a solitary molecular device, e.g., an optical switch, or, depending on the context, may be a vast array of molecular-level devices, e.g., an array of individually addressable, pixel-sized, optical switches, which are in fact linked covalently as a single molecule in a self-assembling implementation. Thus, it can be recognized that some molecular systems comprise a super-molecule where selective domain changes of individual molecular devices forming the system are available. The term "molecular system" as used herein refers to both solitary molecular devices used systematically, such as in a regular array pixel pattern, and molecularly linked individual devices. No limitation on the scope of the invention is intended by interchangeably using these terms nor should any be implied.

Figure 1A:
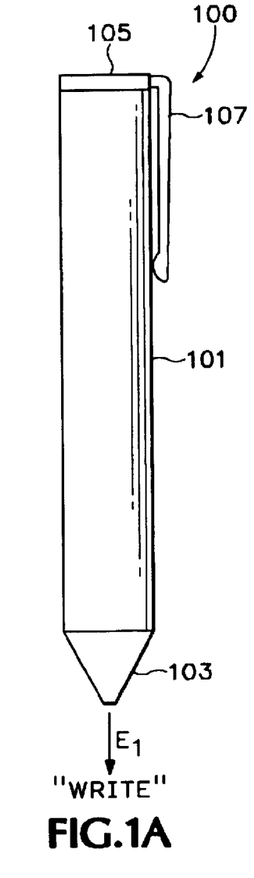
FIG. 1A is a schematic drawing in elevation view of a writing instrument according to the present invention, demonstrating an electrical writing field vector, "E1."
Figure 1B:
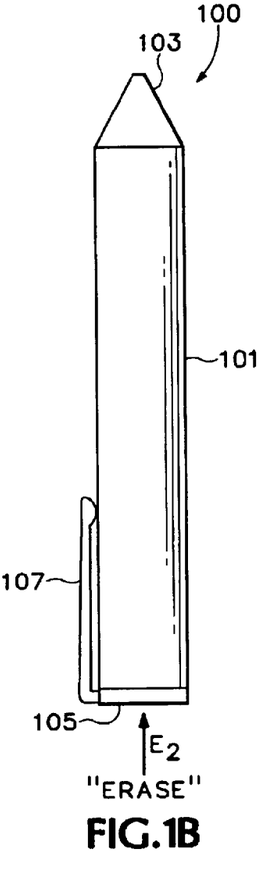
FIG. 1B is a schematic drawing in elevation view of the writing instrument of FIG. 1A, demonstrating an electrical erasing writing field vector, "E2".

Shown schematically in FIGS. 1A and 1B is an electronic writing and erasing instrument, or "e-pencil" hereinafter, 100 in accordance with the present invention. A barrel, or casing, 101 is formed in a shape and dimension suitable to handheld usage and may have the shape and feel of a conventional pencil. It includes a write tip 103 and erase head 105 that function on electronic rewritable surfaces just like a conventional pencil on conventional paper. It can optionally be provided with a clip 107 for convenient pocket or other holder carrying.

The write tip 103 provides a first polarity directed electric field ($E_1$) source. The erase head 105 provides an opposite polarity directed electric field ($E_2$) source. Optionally, switching mechanism (not shown) may be provided wherein the polarity at either of the pencil ends may be reversed such that the same end can provide the write or erase function or wherein both may be reversed to change the nib size for the function of interest, e.g., narrow erase to broad erase; see e.g., FIG. 4A description hereinafter.

To describe at least one implementation of a molecular colorant used to create a rewritable surface upon which the present invention can be used, the reader is directed to the Appendix hereto. Moreover, the present invention will be useful with other electronically rewritable surfaces such as those made using Gyricon or E-Ink products.

Figure 2A:
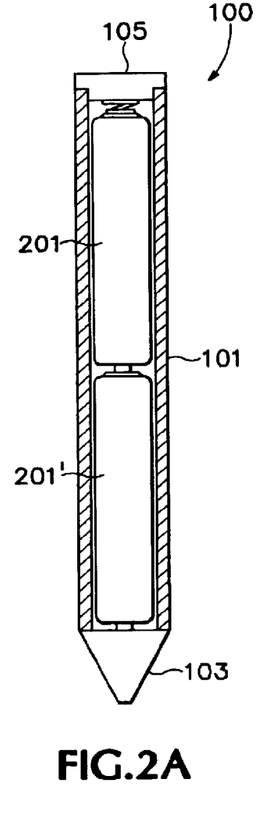
FIGS. 2A, 2B, and 2C are schematic drawings in transparent elevation view of the present invention as shown in FIGS. 1A, 1B, demonstrating writing features and methodology.
Figure 2B:
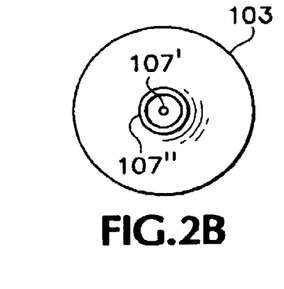
Figure 2C:
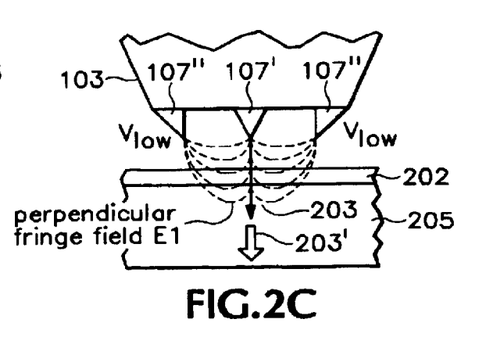

Referring now also to FIGS. 2A through 2C, the write tip 103 is used to create at least one picture-element (pixel) sized point or multi-pixel line in contact and translation across a rewritable surface. The preferred embodiment of the e-pencil 100 is an untethered, handheld, battery-powered device. Batteries are depicted as two, exemplary, common AAA-sized batteries 201, 201' connected in series in a known manner. It will be recognized by those skilled in the art that other power pack mechanisms, such as AC-transformers can be used to power the e-pencil 100, providing the ability for greater or lesser power than a battery driven implementation. Moreover, field strength maintaining and surge protection mechanisms as would be known in the art may be employed with the present invention.

Figure 4A:
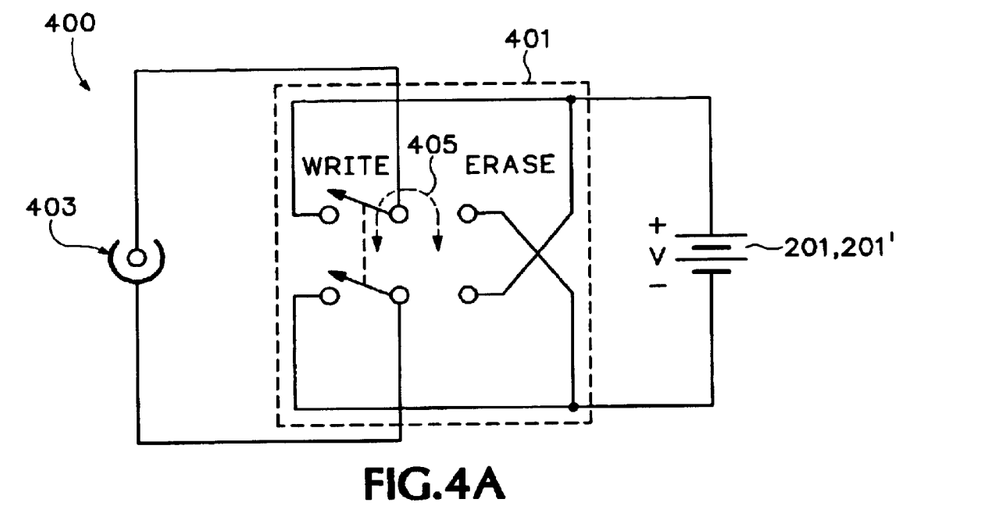
FIG. 4A is an electrical schematic diagram associated with the present invention as shown in FIGS. 2A, 2B, 2C, 3A, 3B and 3C.

An electrical schematic is shown in FIG. 4A for a simplified embodiment where one tip electrode 403 is used for both writing and erasing. The batteries 201, 201' are represented as power source "V." The power source V is connected via a double pole, double throw switch 401 (shown in an OFF position) to the tip electrode 403 (analogous to FIGS. 1A, 1B, elements 103 and 105 combined). The dashed-line arrow 405 represents the capability of switching the polarity of the voltage to the tip electrode 403.

In a more elaborate embodiment, as shown in FIGS. 2A through 3C, it may be desirable to have a writing tip 103 configured as an electrical point source and an erasing head 105 configured as a broader electrical area source just as a conventional pencil does.

Figures 3A, 3B, 3C:
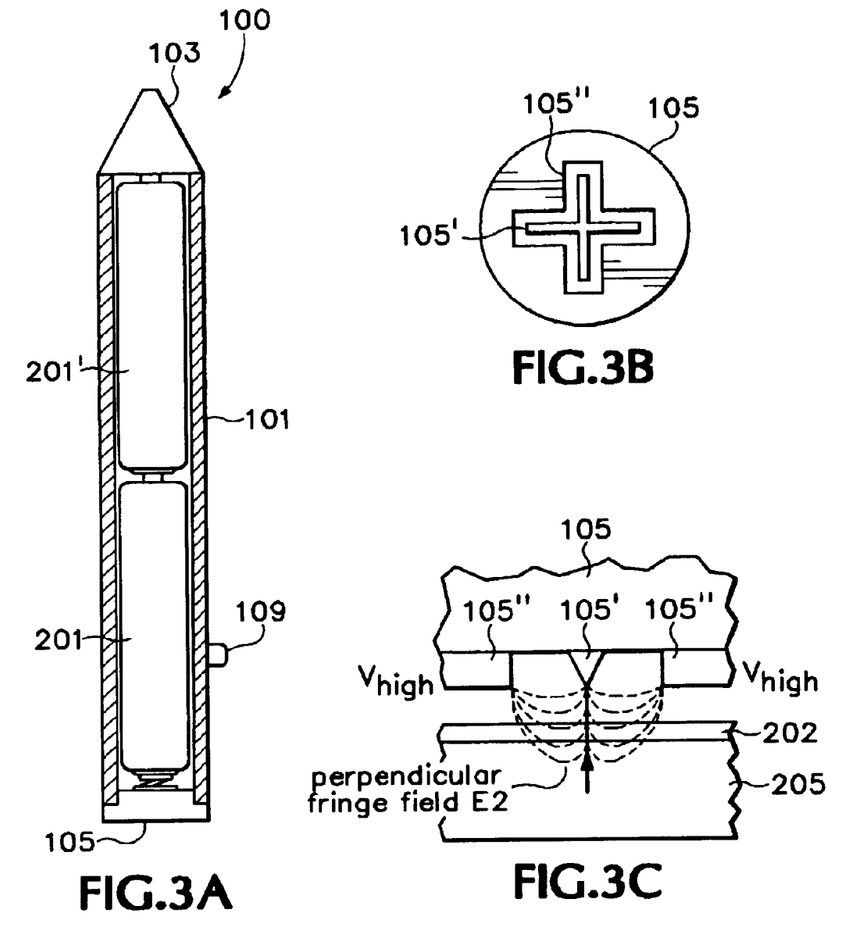
FIGS. 3A, 3B, and 3C are schematic drawings in transparent elevation view of the present invention as shown in FIGS. 1A, 1B, 2A, 2B, and 2C, demonstrating erasing features and methodology.

Returning to FIGS. 2A through 2C and now also FIGS. 3A through 3C, one embodiment of the e-pencil 100 has the electric field write tip 101 and the electric field erase head 105 appropriately connected in a known manner to a battery, or batteries, 201, 201'. The write tip 101 preferably includes a circular rod 107' and cylinder 107'" electrode pair that are concentric and closely spaced. The write tip 103 is ideally housed within a conical end cap of the e-pencil 100, giving the appearance of a standard lead pencil. The electrode pair 107', 107" is electrically biased (±V as in FIG. 4A) to produce a fringe field—represented in FIGS. 2C and 3C as semi-circular lines labeled "Perpendicular Fringe Field" (PFF)—having a principal field vector 203 that emanates along the axis of the e-pencil 100 from the central rod electrode 107', and substantially perpendicular to an erasable writing substrate 205, returning to the cylinder electrode 107". The writing substrate 205 has a layer 202 of colorant composed of bistable colorant pixels (see Appendix). The electrodes 107', 107" are biased so the principal field vector 203 from the write tip 101 orients, or otherwise switches, bistable colorant 202 (see Appendix) pixels exposed to the PFF to its writing image color.

Note that the drawn line width of the image produced by the writing tip 103 is dependent on the electrode geometry and may be varied with the bias voltage. The written lines may be "tunable," i.e, broadened in width by increasing the voltage (+V−) on the writing electrode 107. For example, a hand controlled switch 109—e.g., a potentiometer added to FIG. 4A between the power source V and electrode 403—accessible along the barrel 101 of the pencil 100 may be used for this purpose. The writing tip 103 itself may be interchangeable with other line source nib embodiments to simulate fine writing instruments such as fountain pens. Vector 203' represents a higher voltage, "broader" nib effect. More sophisticated, known manner, voltage control circuitry may be employed.

Only the principal field vector 203 writes the image. The field return lines are radially distributed between the rod and cylinder electrodes 107', 107", thereby diluting field intensity below the writing threshold. The writing tip electrodes 107', 107" may be made from most any conductive metal and may be further coated or plated to produce a good wear and low friction writing surface. The writing tip 103 may be gimbaled to allow correct contact and orientation of the writing tip with the media surface 202 while the e-pencil is held at an angle to the media surface.

The erase head 105 consists of an electrode pair 105', 105" with geometry suitable for producing a PFF having a more distributed principal field area. By comparison to the writing tip 103, the erase head 105 may consist of a larger area circular rod and cylinder electrode. Alternative geometries, such as a cross-shaped center electrode and conformal outer electrode as shown in FIG. 3B can be designed to suit a particular implementation. The erase head electrode geometries are selected in these examples to mimic the approximate erase area of a standard lead pencil, but others may be employed. The erase head electrodes 105', 105" are biased to produce a principal field area or lines that orient, or otherwise switch, bistable colorant pixels contacted by the field to its transparent or media background color in the media area in contact with the erase head 105.

The writing tip's conical end cap and erase head are preferably assembled, e.g. threaded, at opposing ends of the barrel 101 that forms the casing for the e-pencil 100. This allows the batteries 201, 201'used to power the e-pencil to be contained and electrically connected within the barrel in a manner similar to a standard flashlight; in alternative embodiments (not shown) button-type or other commercially available batteries may be employed.

Standard step-up or step-down voltage components and circuitry may be added to drive the electrodes at voltages greater than or less than that provided by the batteries. Conventional electrical switch or switches (not shown) operable on the cylinder exterior may be used to activate the e-pencil, change writing or erasing line widths, or change the function of either the writing tip or erase head to its opposing function. In the latter case, the erase head may be biased to write broad lines for such things as area fills.

The electronic pencil and rewritable paper combination offer great benefit over a wide set of applications. The electronic pencil is nearly as simple in construction as a common flashlight and should have low manufacturing cost. The pencil uses very low current fields to write and erase and, therefore, should be very battery efficient. Standard note pads, such as Post-It™ Notes, used for reminders, to-do lists, grocery lists, phone messages and the like, may be substituted for by a more permanent, less messy, single rewritable sheet used in combination with the e-pencil. Such a sheet, for example, may have a magnetic backing for attachment to a refrigerator, cabinet or interior car surface. The electronic erase feature eliminates the mess and residual image (stain) that often accompany similarly intended pencil and paper or white board and highlighting pen products; the electronic erase function provides a completely renewed writing surface.

In operation, to write on a surface having a pixel surface including a layer 202 of field-orientable, bistable, colorant (note that this can be any surface or media type upon which the colorant layer can be formed), the end-user moves the e-pencil 100 across the surface in the same manner as writing with a conventional pencil or pen. The perpendicular fringe field El (see FIGS. 1A and 2C) re-orients the pixels in the colorant layer, matching the strokes of the e-pencil 100. To erase writing produced in that manner, the end-user uses the reverse fringe field E2 (see FIGS. 1B and 3C), moving the "eraser" in the same manner as erasing with a conventional pencil or pen.

Figure 5A:
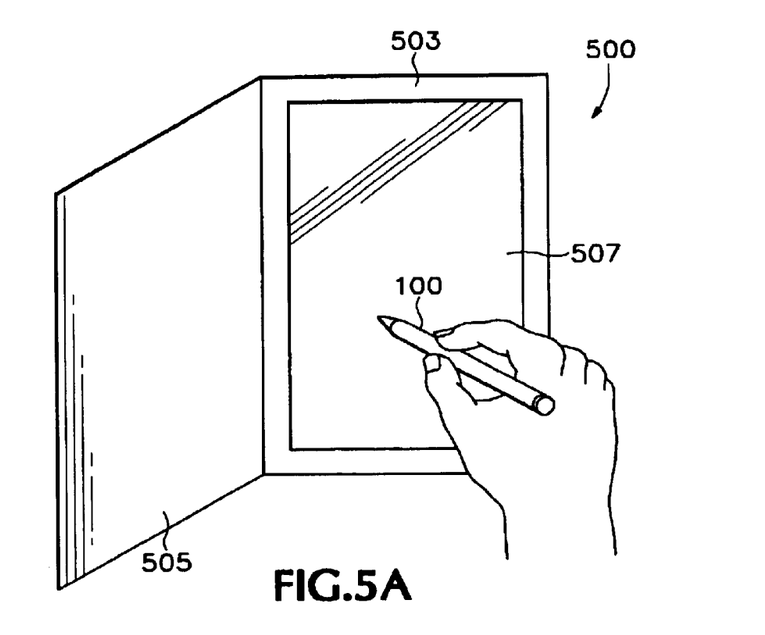
FIG. 5A is an illustration of the present invention in an electronic writing system embodiment.

An exemplary embodiment writing system 500 in accordance with the present invention is shown in FIG. 5A. An electronic folio 501 includes a writing board, or similar support platform, 503 and, optionally, a security cover 505. An electronic media 507 having a writing surface including a bistable, bichromal colorant (such as formed of a layer of molecular devices as described in the Appendix hereto) is supported by the board 503. The end-user writes and erases to the electronic media 507 using the untethered, electronic stylus 100 described hereinbefore.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . ." and no process step herein is to be construed under those provisions unless the step or steps are expressly recited using the phrase "comprising the step(s) of . . ."

APPENDIX

Molecules evidencing one of several new types of switching are provided for the colorant layer 101. That is to say, the present invention introduces several new types of switching mechanisms that distinguish it from the prior art:

(1) an electric field ("E-field") induced rotation of at least one rotatable section (rotor) or a molecule to change the band gap of the molecule;

(2) E-field induced charge separation or recombination of the molecule via chemical bonding change to change the band gap; and (3) E-field induced band gap change via molecular folding or stretching.

Thus, the color switching is the result of an E-field induced intramolecular change rather than a diffusion or oxidation/reduction reaction, in contrast to prior art approaches. Also, the part of the molecule that moves is quite small, so the switching time is expected to be quite fast. Also, the molecules are much simpler and thus easier and cheaper to make than the rotaxanes, catenanes, and related compounds.

The following are examples of model molecules with a brief description of their function:

(1) E-field induced band gap change via molecular conformation change (rotor/stator type of model)—FIGS. 4 and 5a–5c;

(2a) E-field-induced band gap change caused by the change of extended conjugation via charge separation or recombination accompanied by increasing or decreasing band localization—FIG. 6a;

(2b) E-field-induced band gap change caused by change of extended conjugation via charge separation or recombination and $\pi$-bond breaking or formation—FIG. 6b; and (3) E-field induced band gap change via molecular folding or stretching.

Each model, with supporting examples, is discussed below. However, the examples given are not to be considered limiting the invention to the specific molecular systems illustrated, but rather merely exemplary of the above switching mechanisms.

Model (1)

E-Field-Induced Band Gap Change Via Molecular Conformation Change (Rotor/Stator Type of Model)

FIG. 4 is a schematic depiction of one embodiment of this model, which involves an E-field-induced band gap change via molecular conformation change (rotor/stator type of model). As shown in FIG. 4, the molecule 430 comprises a rotor portion 432 and a stator portion 434. The rotor portion 432 rotates with an applied electric field. In one state, depicted on the left side of the drawing, there is an extended conjugation through the entire molecule, resulting in a relatively smaller band gap and thereby longer wavelength (red-shifted) photo-absorption. In the other state, following rotation of the rotor, depicted on the right side of the drawing, the extended conjugation is changed, resulting in a relatively larger band gap and thereby shorter wavelength (blue-shifted) photo-absorption. FIGS. 5a–5c depict an alternate, and preferred, embodiment of this Model 1; these latter Figures are discussed in connection with Examples 1 and 2 of this Model 1 below.

The following requirements must be met in this model:

(a) The molecule must have at least one rotor segment and at least one stator segment;

(b) In one state of the molecule, there should be delocalized HOMOs and/or LUMOs ($\pi$-states and/or non-bonding orbitals) that extend over a large portion of the molecule (rotor(s) and stator(s)), whereas in the other state, the orbitals are localized on the rotor(s) and stator(s), and other segments;

(c) The connecting unit between rotor and stator can be a single $\sigma$-bond or at least one atom with (1) non-bonding electrons (p or other electrons), or (2) $\pi$-electrons, or (3) 90 -electrons and non-bonding electron(s);

(d) The non-bonding electrons, or $\pi$-electrons, or $\pi$-electrons and non-bonding electron(s) of the rotor(s) and stator(s) can be localized or de-localized depending on the conformation of the molecule, while the rotor rotates when activated by an E-field;

(e) The conformation(s) of the molecule can be E-field dependent or bi-stable;

(f) The bi-stable state(s) can be achieved by intra- or inter-molecular forces such as hydrogen bonding, Coulomb force, van der Waals force, metal ion complex or dipole inter-stabilization; and (g) The band gap of the molecule will change depending on the degree of non-bonding electron, or π-electronic or π-electron and non-bonding electron de-localization of the molecule. This will control the optical properties (e.g., color and/or index of refraction, etc.) of the molecule.

Following are two examples of this model (Examples 1 and 2):

The novel bi-modal molecules of the present invention are active optical devices that can be switched with an external electric field. Preferably, the colorant molecules are bi-stable. The general idea is to design into the molecules a rotatable middle segment (rotor) 432 that has a large dipole moment (see Examples 1 and 2) and that links two other portions of the molecule 430 that are immobilized (stators) 434. Under the influence of an applied electric field, the vector dipole moment of the rotor 432 will attempt to align parallel to the direction of the external field. However, the molecule 430 is designed such that there are inter- and/or intra-molecular forces, such as hydrogen bonding or dipole-dipole interactions as well as steric repulsions, that stabilize the rotor 432 in particular orientations with respect to the stators 434. Thus, a large electric field is required to cause the rotor 432 to unlatch from its initial orientation and rotate with respect to the stators 434.

Once switched into a particular orientation, the molecule 430 will remain in that orientation until it is switched to a different orientation, or reconfigured. However, a key component of the molecule design is that there is a steric repulsion or hindrance that will prevent the rotor 432 from rotating through a complete 180 degree half cycle. Instead, the rotation is halted by the steric interaction of bulky groups on the rotor 432 and stators 434 at an optically significant angle of typically between 10° and 17° from the initial orientation. For the purposes of illustration, this angle is shown as 90° in the present application. Furthermore, this switching orientation may be stabilized by a different set of inter- and/or intra-molecular hydrogen bonds or dipole interactions, and is thus latched in place even after the applied field is turned off. For bi- or multi-stable colorant molecules, this ability to latch the rotor 432 between two states separated by an optically significant rotation from the stators is crucial.

The foregoing strategy may be generalized to design colorant molecules to provide several switching steps so as to allow multiple states (more than two) to produce a multi-state (e.g., multi-color) system. Such molecules permit the optical properties of the colorant layer to be tuned continuously with a decreasing or increasing electric field, or changed abruptly from one state to another by applying a pulsed field.

Further, the colorant molecules may be designed to include the case of no, or low, activation barrier for fast but volatile switching. In this latter situation, bi-stability is not required, and the molecule is switched into one state by the electric field and relaxes back into its original state upon removal of the field ("bi-modal"). In effect, these forms of the bi-modal colorant molecules are "self-erasing". In contrast, with bi-stable colorant molecules, the colorant molecule remains latched in its state upon removal of the field (non-volatile switch), and the presence of the activation barrier in that case requires application of an opposite field to switch the molecule back to its previous state.

When the rotor 432 and stators 434 are all co-planar, the molecule is referred to as "more-conjugated". Thus, the non-bonding electrons, or π-electrons, or π-electrons and non-bonding electrons of the colorant molecule, through its highest occupied molecular orbital (HOMO) and lowest unoccupied molecular orbital (LUMO), are delocalized over a large portion of the molecule 430. This is referred to as a "a red-shifted state" for the molecule, or "optical state I". In the case where the rotor 432 is rotated out of conjugation by approximately 90° with respect to the stators 434, the conjugation of the molecule 430 is broken and the HOMO and LUMO are localized over smaller portions of the molecule, referred to as "less-conjugated". This is a "blue-shifted state" of the molecule 430, or "optical state II". Thus, the colorant molecule 430 is reversibly switchable between two different optical states.

It will be appreciated by those skilled in the art that in the ideal case, when the rotor 432 and stators 434 are completely coplanar, then the molecule is fully conjugated, and when the rotor 432 is rotated at an angle of 90° with respect to the stators 434, then the molecule is non-conjugated. However, due to thermal fluctuations, these ideal states are not fully realized, and the molecule is thus referred to as being "more-conjugated" in the former case and "less-conjugated" in the latter case. Further, the terms "red-shifted" and "blue-shifted" are not meant to convey any relationship to hue, but rather the direction in the electromagnetic energy spectrum of the energy shift of the gap between the HOMO and LUMO states.

Examples 1 and 2 show two different orientations for switching the molecules. Example 1a below depicts a first generic molecular example for this Model 1.

Con₁----Connecting Group
Con₂----Connecting Group
SB----Stator B
SA----Stator A
A⁻----Acceptor (Electron withdrawing group)
D⁺----Donor (Electron donating group)

EXAMPLE 1a where:

The letter A⁻ represents an Acceptor group; it is an electron-withdrawing group. It may be one of the following: hydrogen, carboxylic acid or its derivatives, sulfuric acid or its derivatives, phosphoric acid or its derivatives, nitro, nitrile, hetero atoms (e.g., N, O, S, P, F, Cl, Br), or functional groups with at least one of above-mentioned hetero atoms (e.g., OH, SH, NH, etc.), hydrocarbons (either saturated or unsaturated) or substituted hydrocarbons.

The letter D⁺ represents a Donor group; it is an electron-donating group. It may be one of following: hydrogen, amine, OH, SH, ether, hydrocarbon (either saturated or unsaturated), or substituted hydrocarbon or functional group with at, least one of hetero atom (e.g., B, Si, I, N, O, S, P). The donor is differentiated from the acceptor by that fact that it is less electronegative, or more electropositive, than the acceptor group on the molecule.

The letters Con₁ and Con₂ represent connecting units between one molecule and another molecule or between a molecule and the solid substrate (e.g., metal electrode, inorganic or organic substrate, etc.): They may be any one of the following: hydrogen (utilizing a hydrogen bond), multivalent hetero atoms (i.e., C, N, O, S, P, etc.) or functional groups containing these hetero atoms (e.g., NH, PH, etc.), hydrocarbons (either saturated or unsaturated) or substituted hydrocarbons.

The letters SA and SB are used here to designate Stator A and Stator B. They may be a hydrocarbon (either unsaturated or saturated) or substituted hydrocarbon. Typically, these hydrocarbon units contain conjugated rings that contribute to the extended conjugation of the molecule when it is in a planar state (red shifted state). In those stator units, they may 3-dimensional scaffolding to allow the molecules to pack together while providing space for each rotor to rotate over the desired range of motion.

Example 1b below is a real molecular example of Model 1. In Example 1b, the rotation axis of the rotor is designed to be nearly perpendicular to the net current-carrying axis of the molecules, whereas in Example 2, the rotation axis is parallel to the orientation axis of the molecule. These designs allow different geometries of molecular films and electrodes to be used, depending on the desired results contain the bridging group $G_n$ and/or the spacing group $R_n$. The bridging group (e.g., acetylene, ethylene, amide, imide, imine, azo, etc.) is typically used to connect the stator to the rotor or to connect two or more conjugated rings to achieve a desired chromophore. The connector may alternately comprise a single atom bridge, such as an ether bridge with an oxygen atom, or a direct sigma bond between the rotor and stator. The spacing groups (e.g., phenyl, isopropyl or tertbutyl, etc.) are used to provide an appropriate EXAMPLE 1b where:

The letter A is an Accept or group; it is an electron withdrawing group. It may be one of following: hydrogen, carboxylic acid or its derivatives, sulfric acid or its derivatives, phosphoric acid or its derivatives, nitro, nitrile, hetero atoms (e.g., N, O, S, P, F, Cl, Br), or functional group with at least one of above-mentioned hetero atoms (e.g., OH, SH, NH, etc.), hydrocarbon (either saturated or unsaturated) or substituted hydrocarbon.

The letter $D^+$ represents a Donor group; it is an electron-donating group. It may be one of following: hydrogen, amine, OH, SH, ether, hydrocarbon (either saturated or unsaturated), or substituted hydrocarbon or functional group with at least one of hetero atom (e.g., B, Si, I, N, O, S, P). The donor is differentiated from the acceptor by that fact that it is less electronegative, or more electropositive, than the acceptor group on the molecule.

The letters $Con_1$ and $Con_2$ represent connecting units between one molecule and another molecule or between a molecule and the solid substrate (e.g. metal electrode, inorganic or organic substrate, etc.). They may be any one of the following: hydrogen (utilizing a hydrogen bond), multivalent hetero atoms (i.e., C, N, O, S, P, etc.) or functional groups containing these hetero atoms (e.g., NH, PH, etc.), hydrocarbons (either saturated or unsaturated) or substituted hydrocarbons.

Letters $R_1$, $R_2$, $R_3$ represent spacing groups built into the molecule. The function of these spacer units is to provide an appropriate 3-dimensional scaffolding to allow the molecules to pack together while providing rotational space for each rotor. They may be any one of the following: hydrogen, hydrocarbon (either saturated or unsaturated) or substituted hydrocarbon.

Letters $G_1$, $G_2$, $G_3$, and $G_4$ are bridging groups. The function of these bridging groups is to connect the stator and rotor or to connect two or more conjugated rings to achieve a desired chromophore. They may be any one of the following: hetero atoms (e.g., N, O, S, P, etc.) or functional groups with at least one of above-mentioned hetero atoms (e.g., NH or NHNH, etc.), hydrocarbons (either saturated or unsaturated) or substituted hydrocarbons. The connector may alternately comprise a single atom bridge such as an ether bridge with an oxygen atom, or a direct sigma bond between the rotor and stator.

In Example 1b above, the vertical dotted lines represent other molecules or solid substrates. The direction of the switching field is perpendicular to the vertical dotted lines. Such a configuration is employed for electrical switching; for optical switching, the linking moieties may be eliminated, and the molecule may be simply placed between the two electrodes. They may also be simply used to link one molecule to another molecule or a molecule to an organic or inorganic solid substrate.

Referring to FIG. 5a, the molecule shown above (Example 1b) has been designed with the internal rotor 432 perpendicular to the orientation axis of the entire molecule 430. In this case, the external field is applied along the orientation axis of the molecule 430 as pictured—the electrodes (vertical dotted lines) are oriented perpendicular to the plane of the paper and perpendicular to the orientation axis of the molecule 430. Application of an electric field oriented from left to right in the diagrams will cause the rotor 432 as pictured in the upper diagram to rotate to the position shown on the lower right diagram, and vice versa. In this case, the rotor 432 as pictured in the lower right diagram is not coplanar with the rest of the molecule, so this is the blue-shifted optical state of the molecule, whereas the rotor is coplanar with the rest of the molecule on the upper diagram, so this is the red-shifted optical state of the molecule. The structure shown in the lower left diagram depicts the transition state of rotation between the upper diagram (co-planar, conjugated) and the lower right diagram (central portion rotated, non-conjugated).

The molecule depicted in Example 1b is chromatically transparent or blue-shifted. In the conjugated state, the molecule is colored or is red-shifted.

For the molecules in Example 1b, a single monolayer molecular film is grown, for example using Langmuir-Blodgett techniques or self-assembled monolayers, such that the orientation axis of the molecules is perpendicular to the plane of the electrodes used to switch the molecules. Electrodes may be deposited in the manner described by Collier et al, supra, or methods described in the above-referenced patent applications and issued patent. Alternate thicker film deposition techniques include vapor phase deposition, contact or ink-jet printing, or silk screening.

Example 2a below depicts a second generic molecular example for this Model 1.

$Con_1$----Connecting Group
$Con_2$----Connecting Group
SB----Stator B
SA----Stator A
$A^-$----Acceptor (Electron withdrawing group)
$D^+$----Donor (Electron donating group)

EXAMPLE 2b where:

The letter $A^-$ is an Acceptor group; it is an electron-withdrawing group. It may be one of following: hydrogen, carboxylic acid or its derivatives, sulfuric acid or its derivatives, phosphoric acid or its derivatives, nitro, nitrile, hetero atoms (e.g., N, O, S, P, F, Cl, Br), or functional group with at least one of above-mentioned hetero atoms (e.g., OH, SH, NH, etc.), hydrocarbon (either saturated or unsaturated) or substituted hydrocarbon.

The letter $D^+$ represents a Donor group; it is an electron-donating group. It may be one of following: hydrogen, amine, OH, SH, ether, hydrocarbon (either saturated or unsaturated), or substituted hydrocarbon or functional group with at least one of hetero atom (e.g., B, Si, I, N, O, S, P). The donor is differentiated from the acceptor by that fact that it is less electronegative, or more electropositive, than the acceptor group on the molecule.

The letters $Con_1$ and $Con_2$ represent connecting units between one molecule and another molecule or between a molecule and the solid substrate (e.g., metal electrode, inorganic or organic substrate, etc.). They may be any one of the following: hydrogen (utilizing a hydrogen bond), multivalent hetero atoms (i.e., C, N, O, S, P, etc.) or functional groups containing these hetero atoms (e.g., NH, PH, etc.), hydrocarbons (either saturated or unsaturated) or substituted hydrocarbons.

The letters SA and SB are used here to designate Stator A and Stator B. They can be a hydrocarbon (either unsaturated or saturated) or substituted hydrocarbon. Typically, these hydrocarbon units contain conjugated rings that contribute to the extended conjugation of the molecule when it is in a planar state (red shifted state). In those stator units, they may contain bridging groups $G_n$ and/or spacing groups $R_n$. A bridging group is typically used to connect the stator and rotor or to connect two or more conjugated rings to achieve a desired chromophore The connector may alternately comprise a single atom bridge, such as an ether bridge with an oxygen atom, or a direct sigma bond between the rotor and stator. A spacing group provides an appropriate 3-dimensional scaffolding to allow the molecules to pack together while providing rotational space for each rotor.

Example 2b below is another real molecular example of Model 1.

On State (Optical State I)

Switch On ‖ Switch Off

Off State (Optical State II)

EXAMPLE 2b where:

The letter A⁻ is an Acceptor group; it is an electron-withdrawing group. It may be one of following: hydrogen, carboxylic acid or its derivatives, sulfuric acid or its derivatives, phosphoric acid or its derivatives, nitro, nitrile, hetero atoms (e.g., N, O, S, P, F, Cl, Br), or functional group with at least one of above-mentioned hetero atoms (e.g., OH, SH, NH, etc.), hydrocarbon (either saturated or unsaturated) or substituted hydrocarbon.

The letter D⁺ represents a Donor group; it is an electron-donating group. It may be one of following: hydrogen, amine, OH, SH, ether, hydrocarbon (either saturated or unsaturated), or substituted hydrocarbon or functional group with at least one of hetero atom (e.g., B, Si, I, N, O, S, P). The donor is differentiated from the acceptor by that fact that it is less electronegative, or more electropositive, than the acceptor group on the molecule.

The letters $Con_1$ and $Con_2$ represent connecting units between one molecule and another molecule or between a molecule and the solid substrate (e.g., metal electrode, inorganic or organic substrate, etc.). They may be any one of the following: hydrogen (utilizing a hydrogen bond), multivalent hetero atoms (i.e., C, N, O, S, P, etc.) or functional groups containing these hetero atoms (e.g., NH, PH, etc.), hydrocarbons (either saturated or unsaturated) or substituted hydrocarbons.

The letters $R_1$, $R_2$ and $R_3$ represent spacing groups built into the molecule. The function of these spacer units is to provide an appropriate 3-dimensional scaffolding to allow the molecules to pack together while providing rotational space for each rotor. They may be any one of the following: hydrogen, hydrocarbon (either saturated or unsaturated) or substituted hydrocarbon.

The letters $G_1$, $G_2$, $G_3$, $G_4$, $G_5$, $G_6$, $G_7$, and $G_8$ are bridging groups. The function of these bridging groups is to connect the stator and rotor or to connect two or more conjugated rings to achieve a desired chromophore. They may be any one of the following: hetero atoms (e.g., C, N, O, S, P, etc.) or functional group with at least one of above-mentioned hetero atoms (e.g., NH or NHNH, etc.), hydrocarbons (either saturated or unsaturated) or substituted hydrocarbons. The connector may alternately comprise a single atom bridge such as an ether bridge with an oxygen atom, or a direct sigma bond between the rotor and stator.

The letters $J_1$ and $J_2$ represent tuning groups built into the molecule. The function of these tuning groups (e.g., OH, NHR, COOH, CN, nitro, etc.) is to provide an appropriate functional effect (e.g. both inductive effect and resonance effects) and/or steric effects. The functional effect is to tune the band gap ($\Delta E_{HOMO/LUMO}$) of the molecule to get the desired electronic as well as optical properties of the molecule. The steric effect is to tune the molecular conformation through steric hindrance, inter- or intra-molecular interaction forces (e.g. hydrogen bonding, Coulomb interaction, van der Waals forces) or to provide bi- or multiple-stability of molecular orientations. They may be any one of the following: hydrogen, hetero atoms (e.g., N, O, S, P, B, F, Cl, Br, and I), functional groups with at least one of above-mentioned hetero atoms, hydrocarbons (either saturated or unsaturated) or substituted hydrocarbons.

The molecule shown above (Example 2b) has been designed with the internal rotor parallel to the orientation axis of the entire molecule. In this case, the external field is applied perpendicular to the molecular axis—the electrodes are oriented parallel to the long axis of the molecule and can be either nominally perpendicular or parallel to the plane of the above model structures. For example, application of an electric field to the upper molecule shown above where the field lines are perpendicular to the molecular axis and pointing upward will cause the rotor as pictured in that diagram to rotate to approximately 90 degrees and appear edge on, as shown in the lower molecular diagram above, and vice versa. In this case, the rotor as pictured in the lower diagram is not coplanar with the rest of the molecule, so this is the blue-shifted optical state of the molecule, or optical state II, whereas the rotor is coplanar with the rest of the molecule on the upper diagram, so this is the red-shifted optical state of the molecule, or optical state I. The letters N, H, and O retain their usual meaning.).

FIG. 5a depicts molecules similar to those of Examples 1b and 2b, but simpler, comprising a middle rotor portion 432 and two end stator portions 434. As in Examples 1b and 2b, the rotor portion 432 comprises a benzene ring that is provided with substituents that render the rotor with a dipole. The two stator portions 434 are each covalently bonded to the benzene ring through an azo linking, and both portions comprise an aromatic ring.

FIG. 5b is a schematic representation (perspective), illustrating the planar state, with the rotor 432 and stators 434 all co-planar. In the planar state, the molecule 430 is fully conjugated, evidences color (first spectral or optical state), and is comparatively more electrically conductive. The conjugation of the rings is illustrated by the π-orbital clouds 500a, 500b above and below, respectively, the plane of the molecule 430.

FIG. 5c is also a schematic representation (perspective), illustrating the rotated state, with the rotor 432 rotated 90° with respect to the stators 434, which remain coplanar. In the rotated state, the conjugation of the molecule 430 is broken. Consequently, the molecule 430 is transparent (second spectral or optical state) and comparatively less electrically conductive.

For the molecules of Example 2b, the films are constructed such that the molecular axis is parallel to the plane of the electrodes. This may involve films that are multiple monolayers thick. The molecules form solid-state or liquid crystals in which the large stator groups are locked into position by intermolecular interactions or direct bonding to a support structure, but the rotor is small enough to move within the lattice of the molecules. This type of structure can be used to build an E-field controlled display or used for other applications as mentioned earlier herein.

Model (2a)

E-Field Induced Band Gap Change Caused by the Change of Extended Conjugation via Charge Separation or Recombination Accompanied by Increasing or Decreasing Band Localization FIG. 6a is a schematic depiction of this model, which involves an E-field-induced band gap change caused by the change of extended conjugation via charge separation or recombination accompanied by increasing or decreasing band localization. As shown in FIG. 6a, the molecule 630 comprises two portions 632 and 634. The molecule 630 evidences a larger band gap state, with less π-delocalization. Application of an electric field causes charge separation in the molecule 630, resulting in a smaller band gap state, with better π-delocalization. Recombination of the charges returns the molecule 630 to its original state.

The following requirement must be met in this model:

(a) The molecule must have a modest dielectric constant $\in_r$ and can be easily polarized by an external E-field, with $\in_r$ in the range of 2 to 10 and polarization fields ranging from 0.01 to 10 V/nm;

(b) At least one segment of the molecule must have non-bonding electrons, or π-electrons, or π-electrons and non-bonding electrons that can be mobilized over the entire molecule or apart of the molecule;

(c) The molecule can be symmetrical or asymmetrical;

(d) The inducible dipole(s) of the molecule can be oriented in at least one direction;

(e) The charges will be separated either partially or completely during E-field induced polarization;

(f) The states of charge separation or recombination can be E-field dependent or bi-stable, stabilized through inter- or intra-molecular forces such as covalent bond formation, hydrogen bonding, charge attraction, Coulomb forces, metal complex, or Lewis acid (base) complex, etc.;

(g) The process of charge separation or recombination of the molecule can involve or not involve σ- and π-bond breakage or formation; and

(h) During the charge separation or re-combination process activated by an E-field, the band gap of the molecule will change depending on the degree of the non-bonding electron, or π-electron, or π-electron and non-bonding electron de-localization in the molecule. Both optical and electrical properties of the molecules will be changed accordingly.

One example of an E-field induced band gap change (color change) via charge separation or recombination involving bond breaking or bond formation is shown below (Example 3):

Optical State I

E-Field Direction

E-Field Direction

Optical State II

EXAMPLE 3 where:

The letters $J_1$, $J_2$, $J_3$, $J_4$ and $J_5$ represent tuning groups built into the molecule. The function of these tuning groups (e.g., OH, NHR, COOH, CN, nitro, etc.) is to provide an appropriate functional effect (e.g., both inductive effect and resonance effects) and/or steric effects: The functional effect is to tune the band gap ($\Delta E_{HOMO/LUMO}$) of the molecule to get the desired electronic as well as optical properties of the molecule. The steric effect is to tune the molecule conformation through steric hindrance, inter- or intra-molecular interaction forces (e.g., hydrogen bonding, Coulomb interaction, van der Waals forces) to provide bi- or multiple-stability of molecular orientation. They may be any one of the following: hydrogen, hetero atom (e.g., N, O, S, P, B, F, Cl, Br and I), functional group with at least one of above-mentioned hetero atoms, hydrocarbon (either saturated or unsaturated) or substituted hydrocarbon.

The letter $G_1$ is a bridging group. The function of the bridging group is to connect two or more conjugated rings to achieve a desired chromophore. The bridging group may be any one of the following: hetero atoms (e.g., N, O, S, P, etc.) or functional group with at least one of above-mentioned hetero atoms (e.g., NH, etc.), hydrocarbon or substituted hydrocarbon.

The letter W is an electron-withdrawing group. The function of this group is to tune the reactivity of the maleic anhydride group of this molecule, which enables the molecule to undergo a smooth charge separation or recombination (bond breaking or formation, etc.) under the influence of an applied external E-field. The electron-withdrawing group may be any one of the following: carboxylic acid or its derivatives (e.g., ester or amide etc.), nitro, nitrile, ketone, aldehyde, sulfone, sulfuric acid or its derivatives, hetero atoms (e.g., F, Cl, etc.) or functional group with at least one of the hetero atoms (e;g., F, Cl, Br, N, O, S. etc.).

An example of an E-field induced band gap change involving the formation of a molecule-metal complex or a molecule-Lewis acid complex is shown below (Example 4):

Optical State I
Eg (HOMO /LUMO ) = 3.46eV
(When $R_1 = R_2 = R_4 = R_5$ = H; $R_3 = CH_3$)

Optical State II
Eg ( HOMO /LUMO ) = 2.04eV
(When $R_1 = R_2 = R_4 = R_5$ = H; $R_3 = CH_3$)

EXAMPLE 4 where:

The letters $J_1$, $J_2$, $J_3$, $J_4$ and $J_5$ represent tuning groups built into the molecule. The function of these tuning groups (e.g., OH, NHR, COOH, CN, nitro, etc.) is to provide an appropriate functional effect (e.g. both inductive and resonance effects) and/or steric effects. The functional effect is to tune the band gap ($\Delta E_{HOMO/LUMO}$) Of the molecule to get the desired electronic as well as optical properties of the molecule. The steric effect is to tune the molecular conformation through steric hindrance, inter- or intra-molecular interaction forces (e.g., hydrogen bonding, Coulomb interaction, van der Waals forces) to provide bi- or multiple-stability of the molecular orientation. They may be any one of the following: hydrogen, hetero atom (e.g., N, O, S, P, B, F, Cl, Br, and I), functional group with at least one of the above-mentioned hetero atoms, hydrocarbon (either saturated or unsaturated) or substituted hydrocarbon.

The letter $G_1$ is a bridging group. The function of the bridging group is to connect two or more conjugated rings to achieve a desired chromophore. The bridging group may be any one of the following: hetero atoms (e.g., N, O, S, P, etc.) or functional group with at least one of above-mentioned hetero atoms (e.g., NH, etc.) or substituted hydrocarbon.

$M^+$ represents metals, including transition metals, or their halogen complexes or $H^+$ or other type of Lewis acid(s).

Model (2b)

E-Field Induced Band Gap Change Caused by the Change of Extended Conjugation via Charge Separation or Recombination and π-Bond Breaking or Formation FIG. 6b is a schematic depiction of this model, which involves an E-field-induced band gap change caused by the change of extended conjugation via charge separation or recombination and π-bond breaking or formation. As shown in FIG. 6b, the molecule 630' comprises two portions 632' and 634'. The molecule 630' evidences a smaller band gap state. Application of an electric field causes breaking of the π-bond in the molecule 630', resulting in a larger band gap state. Reversal of the E-field re-connects the π-bond between the two portions 632' and 634' and returns the molecule 630' to its original state.

The requirements that must be met in this model are the same as listed for Model 2(a).

One example of an E-field induced band gap change cause by extended conjugation via charge separation (σ-bond breaking and π-bond formation) is shown below (Example 5):

EXAMPLE 5 where:

The letter Q is used here to designate a connecting unit between two phenyl rings. It can be any one of following: S, O, NH, NR, hydrocarbon, or substituted hydrocarbon.

The letters $Con_1$ and $Con_2$ are connecting groups between one molecule and another molecule or between a molecule and a solid substrate (e.g., metal electrode, inorganic or organic substrate, etc.). They may be any one of the following: hydrogen (through a hydrogen bond), hetero atoms (i.e., N, O, S, P, etc.) or functional groups with at least one of above-mentioned hetero atoms (e.g., NH, etc.), hydrocarbons (either saturated or unsaturated) or substituted hydrocarbons.

The letters $R_1$ and $R_2$ represent spacing groups built into the molecule. The function of these spacer units is to provide an appropriate 3-dimensional scaffolding to allow the molecules to pack together while providing rotational space for each rotor. They may be any one of the following: hydrogen, hydrocarbons (either saturated or unsaturated) or substituted hydrocarbons.

The letters $J_1$, $J_2$, $J_3$ and $J_4$ represent tuning groups built into the molecule. The function of these tuning groups (e.g., OH, NHR, COOH, CN, nitro, etc.) is to provide an appropriate functional effect (e.g. both inductive and resonance effects) and/or steric effects. The functional effect is to tune the band gap ($\Delta E_{HOMO/LUMO}$) of the molecule to get the desired electronic as well as optical properties of the molecule. The steric effect is to tune the molecular conformation through steric hindrance, inter- or intra-molecular interaction forces (e.g., hydrogen bonding, Coulomb interaction, van der Waals forces) to provide bi- or multiple-stability of molecular orientation. They may also be used as spacing group to provide an appropriate 3-dimensional scaffolding to allow the molecules to pack together while providing rotational space for each rotor. They may be any one of the following: hydrogen, hetero atom (e.g., N, O, S, P, B, F, Cl, Br, and I), functional group with at least one of above-mentioned hetero atom, hydrocarbon (either saturated or unsaturated) or substituted hydrocarbon.

The letter $G_1$ is a bridging group. The function of the bridging group is to connect the stator and rotor or to connect two or more conjugated rings to achieve a desired chromophore. The bridging group may be any one of the following: hetero atoms (e.g., N, O, S, P, etc.) or functional groups with at least one of above-mentioned hetero atoms (e.g., NH or NHNH, etc.), hydrocarbon (either saturated or unsaturated) or substituted hydrocarbon.

The letter W is an electron-withdrawing group. The function of this group is to tune the reactivity of the lactone group of this molecule, which enables the molecule to undergo a smooth charge separation or recombination (bond breaking or formation, etc.) under the influence of an applied external E-field. The electron-withdrawing group may be any one of the following: carboxylic acid or its derivatives (e.g., ester or amide etc.), nitro, nitrile, ketone, aldehyde, sulfone, sulfuric acid or its derivatives, hetero atoms (e.g., F, Cl, etc.) or functional group with at least one of hetero atoms (e.g., F, Cl, Br, N, O and S, etc.), hydrocarbon (either saturated or unsaturated) or substituted hydrocarbon.

The uppermost molecular structure has a smaller band gap state than the lowermost molecular structure.

Another example of an E-field induced band gap change caused by breakage of extended π-bond conjugation via charge recombination and σ-bond formation is shown below (Example 6):

EXAMPLE 6 where:

The letter Q is used here to designate a connecting unit between two phenyl rings. It can be any one of following: S, O, NH, NR, hydrocarbon, or substituted hydrocarbon.

The letters $Con_1$ and $Con_2$ are connecting groups between one molecule and another molecule or between a molecule and a solid substrate (e.g., metal electrode, inorganic or organic substrate, etc.). They may be any one of the following: hydrogen, hetero atoms (i.e., N, O, S, P, etc.) or functional group with at least one of above-mentioned hetero atoms (e.g., NH, etc.), hydrocarbon (either saturated or unsaturated) or substituted hydrocarbon.

The letters $R_1$ and $R_2$ represent spacing groups built into the molecule. The function of these spacer units is to provide an appropriate 3-dimensional scaffolding to allow the molecules to pack together while providing rotational space for each rotor. They may be any one of the following: hydrogen, hydrocarbon (either saturated or unsaturated) or substituted hydrocarbon.

The letters $J_1$, $J_2$, $J_3$ and $J_4$ represent tuning groups built into the molecule. The function of these tuning groups (e.g., OH, NHR, COOH, CN, nitro, etc.) is to provide an appropriate functional effect (e.g., both inductive and resonance effects) and/or steric effects. The functional effect is to tune the band gap ($\Delta E_{HOMO/LUMO}$) of the molecule to get the desired electronic as well as optical properties of the molecule. The steric effect is to tune the molecule conformation through steric hindrance, inter- or intra-molecular interaction forces (e.g. hydrogen bonding, Coulomb interaction, van der Waals forces) to provide bi- or multiple-stability of molecular orientation. They may also be used as spacing groups to provide an appropriate 3-dimensional scaffolding to allow the molecules to pack together while providing rotational space for each rotor. They may be any one of the following: hydrogen, hetero atom (e.g., N, O, S, P, B, F, Cl, Br, and I), functional groups with at least one of above-mentioned hetero atom, hydrocarbon (either saturated or unsaturated) or substituted hydrocarbon.

The letter $G_1$ is a bridging group. The function of this bridging group is to connect stator and rotor or to connect two or more conjugated rings to achieve a desired chromophore. The bridging group may be any one of the following: hetero atoms (e.g., N, O, S, P, etc.) or functional group with at least one of above-mentioned hetero atoms (e.g., NH or NHNH, etc.), hydrocarbon (either saturated or unsaturated) or substituted hydrocarbon.

The letter W is an electron-withdrawing group. The function of this group is to tune the reactivity of the lactone group of this molecule, which enables the molecule to undergo a smooth charge separation or recombination (bond breaking or formation, etc.) under the influence of an applied external E-field. The electron-withdrawing group may be any one of the following: carboxylic acid or its derivatives (e.g., ester or amide, etc.), nitro, nitrile, ketone, aldehyde, sulfone, sulfuric acid or its derivatives, hetero atoms (e.g., F, Cl etc.) or functional group with at least one of hetero atoms (e.g., F, Cl, Br, N, O, S, etc.), hydrocarbon (either saturated or unsaturated) or substituted hydrocarbon.

Again, the uppermost molecular structure has a smaller band gap state than the lowermost molecular structure.

The present invention turns ink or dye molecules into active devices that can be switched with an external electric field by a mechanism completely different from any previously described electro-chromic or chromogenic material. The general idea is to use modified Crystal Violet lactone type of molecules in which the C—O bond of the lactone is sufficiently labile enough and can undergo a bond breaking and forming (see Examples 5 and 6 above) under the influence of an applied electric field.

A positive and a negative charge are generated during the C—O bond breaking process. The resulting charges will be separated and move in opposite directions parallel to the applied external field (upper part of the molecule), or bond rotation (lower part of the molecule. The two aromatic rings with an extended dipole (upper part and lower part) of the molecule is completely conjugated, and a color (red-shift) results (see Example 5). However, the molecule is designed to have inter- and/or intra-molecular forces, such as hydrogen bonding, Coulomb, or dipole-dipole interactions as well as steric repulsions, or by a permanent external E-field to stabilize both charges in this particular orientation. Thus, a large field is required to unlatch the molecule from its initial orientation. Once switched into a particular orientation, the molecule will remain in that orientation until it is switched out.

When a reverse E-field is applied (Example 6), both charges tend to realign themselves to the direction of the reverse external field. The positive charge on the upper part of the molecule will migrate to the center part of the molecule (tri-aryl methane position) from the side of the molecule through the non-bonding electron, or π-electron, or π-electron and non-bonding electron delocalization. Likewise, the negative charged lower part of the molecule will tend to move closer to the external E-field through C—C bond rotation. A key component of the molecule design is that there is a steric and static repulsion between the $CO_2^-$ and the $J_3$ and $J_4$ groups that will prevent the lower part of the molecule (the negative charged sector) from rotating through a complete 180 degree half cycle. Instead, the rotation is halted by the steric interaction of bulky groups on the lower part and the upper part at an angle, of approximately 90 degrees from the initial orientation.

Furthermore, this 90 degree orientation is stabilized by a C—O bond formation and charge recombination. During this process, a tetrahedral carbon (an isolator) is formed at the tri-aryl methane position. The conjugation of the molecule is broken and the HOMO and LUMO are no longer delocalized over the entire upper part of the molecule. This has the effect of shrinking the size of the volume occupied by the electrons, which causes the HOMO-LUMO gap to increase. A blue-shifted color or transparent state will result during this process.

For colored ink and dye molecules, the limitation of the positive charge migration just between one side of a molecule and the center position is crucial. Another important factor is the ability to switch the rotor (lower part of molecule) between two states separated by an optically significant angle (nominally 10 to 170 degrees) from the stators (the upper part of the molecule). When the intra-molecular charge separation reaches a maximum distance, then the upper most part of the molecule becomes completely conjugated. Thus, the π-electrons or π-electrons and non-bonding electrons of the molecule, through its highest occupied molecular orbital (HOMO) and lowest unoccupied molecular orbital (LUMO), are delocalized over the upper most region. The effect is identical to that for a quantum mechanical particle in a box: when the box is the size of the entire molecule, i.e., when the orbitals are delocalized, then the gap between the HOMO and LUMO is relatively small. In this case, the HOMO-LUMO gap of the molecule is designed to yield the desired color of the ink or dye. The HOMO-LUMO gap for the all-parallel structure can be tuned by substituting various chemical groups ($J_1$, $J_2$, $J_3$, $J_4$, and W) onto the different aromatic rings of the molecule. In the case where the rotor (lower part of the molecule) is rotated by 10 to 170 degrees with respect to the stators (the upper part of the molecule), depending on the nature of the chemical substituents ($J_1$, $J_2$, $J_3$, $J_4$, and W) bonded to the rotor and stator, then the increased HOMO-LUMO gap will correspond to a color that is blue-shifted with respect to the color of the all-parallel structure. With sufficient shifting, the molecule becomes transparent, if the new HOMO-LUMO gap is large enough. Thus, the molecule is switchable between two colors or from one color to a transparent state.

Examples 5 and 6 show two different states of a representative switchable molecule under the influence of an externally applied E-field. For this particular type of molecule, a sufficiently thick molecular film is grown, for example using Langmuir-Blodgett techniques, vapor phase deposition, or electrochemical deposition, such that the orientation axis of the molecules is perpendicular to the plane of the electrodes used to switch the molecules. Another deposition technique is to suspend the molecule as a monomer/oligomer or solvent-based solution that is thick film coated (e.g., reverse roll) or spin-coated onto the substrate and subsequently polymerized (e.g., by UV radiation) or dried while the coating is subjected to an electric field that orients the molecule. A top electrode may be a transparent conductor, such as indiumtin oxide, and the films are grown such that the molecular axis is parallel to the plane of the electrodes. The molecules form solid-state or liquid crystals in which the large stator groups are locked into position by intermolecular interactions or direct bonding to a support structure, but the rotor is small enough to move within the lattice of the molecules.

Model (3)

E-Field Induced Band Gap Change via Molecular Folding or Stretching

FIG. 7 is a schematic depiction of this model, which involves an E-field-induced band gap change caused by the change of extended conjugation via molecular folding or stretching. As shown in FIG. 7, the molecule 730 comprises three portions 732, 734, and 736. The molecule 730 evidences a smaller band gap state due to an extended conjugation through a large region of the molecule. Application of an electric field causes breaking of the conjugation in the molecule 730, due to molecular folding about the central portion 734, resulting in a larger band gap state due to the non-extended conjugation in the large region of the molecule. Reversal of the E-field unfolds the molecule 730 and returns the molecule to its original state. Stretching and relaxing of the central portion 734 of the molecule 730 has the same effect.

The following requirements must be met in this Model:

(a) The molecule must have at least two segments;

(b) Several segments (portions) should have non-bonding electrons, or π-electrons, or π-electrons and non-bonding electrons involved in the HOMOs, LUMOs, and nearby orbitals;

(c) The molecule may be either symmetrical or asymmetrical with a donor group on one side and an acceptor group on another side;

(d) At least two segments of the molecule have some functional groups that will help to stabilize both states of folding and stretching through intra- or inter-molecular forces such as hydrogen bonding, van der Waals forces, Coulomb attraction or metal complex formation;

(e) The folding or stretching states of the molecule must be E-field addressable;

(f) In at least one state (presumably in a fully stretched state), the non-bonding electrons, or π-electrons, or π-electrons and non-bonding electrons of the molecule will be well-delocalized, and the π- and p-electrons electrons of the molecule will be localized or only partially delocalized in other state(s);

(g) The band gap of the, molecules will change depending on the degree of non-bonding electron, or π-electron, or π-electron and non-bonding electron delocalization while the molecule is folded or stretched by an applied external E-field, and this type of change will also affect the electrical or optical properties of the molecule as well; and (h) This characteristic can be applied to these types of molecules for optical or electrical switches, gates, storage or display applications.

An example of an E-field induced band gap change via molecular folding or stretching is shown below (Example 7):

$n = 0$ to $10$

EXAMPLE 7 where:

The letters $R_1$ and $R_2$ represent spacing groups built into the molecule. They may be any one of the following: hydrogen, hydrocarbon (either saturated or unsaturated) or substituted hydrocarbon.

The letters $J_1$, $J_2$, $J_3$, $J_4$ and $J_5$ represent tuning groups built into the molecule. The function of these tuning groups (e.g., OH, NHR, COOH, CN, nitro, etc.) is used to provide an appropriate functional effect (e.g., both inductive and resonance effects) and/or steric effects. The functional effect is to tune the band gap ($\Delta E_{HOMO/LUMO}$) of the molecule to get the desired electronic as well as optical properties of the molecule. The steric effect is to tune the molecular conformation through steric hindrance, inter- or intra-molecular interaction forces (e.g. hydrogen bonding, Coulomb interaction, van der Waals forces) to provide bi- or multiple-stability of molecular orientation. They may also be used as spacing group They may be any one of the following: hydrogen, hetero atom (e.g., N, O, S, P, B, F, Cl, Br and I), functional group with at least one of above-mentioned hetero atom, hydrocarbon (either saturated or unsaturated) or substituted hydrocarbon.

Letters Y and Z are functional groups that will form inter- or intra-molecular hydrogen bonding. They may be any one of following: SH, OH, amine, hydrocarbon, or substituted hydrocarbon.

The molecule on the top of the graphic has a larger band gap due to the localized conjugation various parts of the molecule, while the molecule on the bottom has a smaller band gap due to an extended conjugation through a large region of the molecule.

What is claimed is:

1. An electronic stylus apparatus comprising:

a portable power source;

connected to the power source, at least one electrode for producing a localized, emanating, electric field wherein the field is of a strength sufficient to reorient electronic picture elements formed of an electrically bistable molecular colorant having molecules being selectively switchable between at least two optically distinguishable states, wherein said molecules exhibit an electric field induced band gap change and wherein said electric field induced band gap change occurs via a mechanism selected from a group including (1) molecular conformation change or an isomerization, (2) chance of extended conjugation via chemical bonding change to change the band gap, and (3) molecular folding or stretching; and electronic circuitry for maintaining a substantially constant electric field output of the apparatus.

2. The apparatus as set forth in claim 1 comprising:

connected between said power source and said electrodes) electronic circuitry for switching the polarity of said electric field.

3. The apparatus as set forth in claim 1 comprising:

said at least one electrode is adapted for writing and erasing electrically bistable, bichromal, molecular colorant.

4. The apparatus as set forth in claim 1 comprising:

a hand-held cylindrical pencil shaped body wherein said power source and electrode are incorporated therein such that said apparatus is used in the manner of a conventional writing instrument.

5. An erasable writing system comprising:

an electrically writable-erasable surface having a layer of bistable, bichromal, colorant thereon;

a portable, electronic stylus adapted for writing and erasing said colorant; and a molecular system distributed on the surface, wherein said system includes electrochromic, switchable molecules, each of said molecules being selectively switchable between at least two optically distinguishable states, wherein molecules exhibit an electric field induced band gap change and wherein said electric field induced band gap change occurs via a mechanism selected from a group including (1) molecular conformation change or an isomerization, (2) change of extended conjugation via chemical bonding change to change the band gap, and (3) molecular folding or stretching.

* * * * *